(12) United States Patent
Miyazaki

(10) Patent No.: US 6,375,359 B1
(45) Date of Patent: *Apr. 23, 2002

(54) ROLLING BEARING UNIT WITH ROTATION SPEED SENSOR

(75) Inventor: Hiroya Miyazaki, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/643,768

(22) Filed: Aug. 23, 2000

Related U.S. Application Data

(63) Continuation of application No. 09/210,396, filed on Dec. 14, 1998, now Pat. No. 6,174,088.

(30) Foreign Application Priority Data

Dec. 15, 1997 (JP) .............................. 9-344972
Dec. 18, 1997 (JP) .............................. 9-349312

(51) Int. Cl.$^7$ ................................ F16C 19/08
(52) U.S. Cl. .................. 384/448; 324/207.25
(58) Field of Search .................. 384/448; 324/173, 324/174, 207.25

(56) References Cited

U.S. PATENT DOCUMENTS

| | | | |
|---|---|---|---|
| 5,002,404 A | 3/1991 | Zernickel et al. | 384/448 |
| 5,011,302 A | 4/1991 | Mott et al. | 384/448 |
| 5,640,087 A | 6/1997 | Alff | 384/448 X |
| 5,756,894 A * | 5/1998 | Paolo et al. | 384/448 |
| 5,764,049 A | 6/1998 | Hofmann et al. | 324/173 |
| 5,814,984 A * | 9/1998 | Ohmi et al. | 324/173 |
| 5,852,361 A * | 12/1998 | Ouchi et al. | 324/174 |
| 5,938,346 A * | 8/1999 | Ouchi | 384/448 |

FOREIGN PATENT DOCUMENTS

| | | |
|---|---|---|
| DE | 39 14 289 | 10/1990 |
| DE | 41 10 165 | 1/1992 |
| DE | 195 28 872 | 2/1997 |
| EP | 0 671 628 | 9/1995 |
| EP | 06936889 A1 | 1/1996 |
| EP | 0701133 A1 | 3/1996 |
| EP | 0869365 A1 | 10/1998 |
| EP | 0887647 A1 | 12/1998 |
| JP | 8-26084 | 1/1996 |
| JP | 8-43410 | 2/1996 |
| JP | 8-296634 | * 11/1996 |

* cited by examiner

*Primary Examiner*—Thomas R. Hannon
(74) *Attorney, Agent, or Firm*—Crowell & Moring LLP

(57) ABSTRACT

A rolling bearing unit with a rotation speed sensor comprising a stationary member, a rotatable member having a second raceway, a plurality of rolling members rotatably provided between the first raceway and the second raceway, an encoder fixed to the rotatable member and to be concentric with the rotational axis thereof and having a detected portion the characteristics of which are adapted to alternately change, and a sensor fixed to the stationary member to detect changes in the magnetic characteristics of the encoder to produce signals as the rotatable member rotates, and the sensor having a detecting portion which is opposed to the detected portion of the encoder with a clearance therebetween at a circumferential location where the change in the clearance is minimized when subjected to a load from outside.

1 Claim, 11 Drawing Sheets

ROLLING BEARING UNIT WITH ROTATION SPEED SENSOR

This application is a continuation of application Ser. No. 09/210,396, filed Dec. 14, 1998 now U.S. Pat. No. 6,174,088.

FIELD OF THE INVENTION

The present invention relates to a rolling-bearing unit with rotation speed sensor which is used for rotatably supporting an automobile wheel with respect to the suspension, as well as for detecting the rotation speed of the wheel.

BACKGROUND OF THE INVENTION

A rolling-bearing unit is used for supporting an automobile wheel so that it rotates freely with respect to the suspension. Moreover, in order to be able to control an anti-lock-brake system (ABS) or traction-control system (TCS), it is necessary to detect the rotation speed of the aforementioned wheel. In order to do this, a rolling-bearing unit with rotation speed sensor, in which a rotation speed detection device has been built into the rolling-bearing unit described above, has been widely used in recent years to support the wheel such that it rotates freely with respect to suspension, as well as to detect the rotation speed of the wheel.

FIGS. 1 and 2 show one example of a prior art rotation speed sensor, as disclosed in Japanese Patent Publication No. Toku Kai llei 8-296634, that is used for the purpose described above. This rolling-bearing unit with rotation speed sensor comprises a stationary race or outer race 1 which does not rotate during use. a rotatable ring or hub 2 which is supported on the inside of this outer race 1 and which rotates during use, an encoder 3 which is fixed at one location on this hub 2, and a sensor 4 which is supported by the outer race 1 to detect the rotation speed of the encoder 3. In other words, stationary raceways or outer ring raceways 5 in double rows are formed around the inner peripheral surface, or stationary peripheral surface, of this outer race 1. Moreover, the hub 2 has a pair of inner races 7 which are fixedly fitted around the outer peripheral surface of the main hub body 6.

Rotating raceways or inner ring raceways 8a, 8b are formed around the rotatable peripheral surfaces or outer peripheral surfaces of both of these inner races 7, respectively. Multiple rolling members 9 are rotatably supported by a cage 10 in each row between the inner ring raceways 8a, 8b and outer ring raceways 5, so that they support the hub 2 so as to rotate freely inside the outer race 1.

Moreover, on the axially outer end of the main hub body 6 (end on the outside in the direction of width when installed in the automobile, left end in FIG. 1) in the area that sticks out in the axial direction from the axially outer end of the outer race 1, there is a flange 11 for attaching to the wheel. Also, on the axially inner end of the outer race 1 (end on the center side in the direction of width when installed in the automobile, right end in FIG. 1) there is an installation section 12 for attaching the outer race 1 to the suspension. Furthermore, the space between the opening on the axially outer end of the outer race 1 and the outer peripheral surface around the mid portion of the hub 2 is covered by a seal ring 13.

In order to install a rotation speed sensor in this kind of rolling-bearing unit, the encoder 3 is fitted around a portion closer to the axially inner end of the main hub body 6 that protrudes axially inward from both of the inner races 7. This encoder 3 is formed into a circular ring shape from a magnetic metal plate such as steel and provided with a detected portion 14 on the axially inner face (the right face in FIG. 1) at a portion closer to the outer periphery thereof. This encoder 3 is fitted around a portion closer to the axially inner end of the main hub body 6 and is held in place between a nut 15 that screws to the axially inner end of the main hub body 6, and the surface on the axially inner end face of the inside inner race 7.

The detected section 14 is formed with recesses and lands around in the circumferential direction, and is shaped with a gear-like shape, and the magnetic characteristics of this detected section 14 change alternately at evenly spaced intervals around in the circumferential direction.

Furthermore, a cylindrical-shaped cover 16 with a bottom fits into the opening on the axially inner end of the outer race 1 to cover the opening on the axially inner end of the outer race 1. This cover 16 is made from plastically worked sheet metal, and comprised of a cylindrical fitting section 17 that freely fits inside the opening on the axially inner end of the outer race 1, and a cover plate section 18 that covers the opening on this axially inner end of the cylindrical fitting section 17. A sensor 4 is supported at a radially outer portion in this cover plate section 18, and the tip end face (left end face in FIG. 1) of the detection section 19 of this sensor 4 faces the axially inner face of the detected section 14 of the encoder 3 in the axial direction through a small clearance, for example 0.5 mm.

In the case of the rolling-bearing unit with rotation speed sensor described above, the wheel that is attached to the flange 11 formed on the axially outer end of the hub 2 is able to rotate freely with respect to the suspension that supports the outer race 1. Moreover, as the encoder 3 that is fitted around the axially inner end of the hub 2 rotates with the rotation of the wheel, the lands and recesses formed on the detected section 14 alternately passes by the end surface of the detection section 19 of the sensor 4. As a result, the density of the magnetic flux that flows through the sensor 4 changes, and thus the output of the sensor 4 changes.

The frequency of the changing output of the sensor 4 is proportional to rotation speed of the wheel. Therefore, if the output from the sensor 4 is sent to a controller (not shown in the figure), it is possible to adequately control the ABS or TCS.

In order to secure the reliability in detecting the rotation speed of the wheel by a rolling-bearing unit with rotation speed sensor that functions as described above, it is necessary that the dimension of the gap between the tip end face of the detection section 19 of the sensor 4 and the end surface of the detected section 14 of the encoder 3 be stable. On the other hand, the components that make up the rolling-bearing unit deform elastically as the automobile operates. Particularly, as the automobile is turned fast, the amount of elastic deformation of the components increases due to the moment load that is applied to the hub 2 (by the turning acceleration) from the wheel by way of the flange 11. Also, due to the increase of the amount of this elastic deformation, the dimension of small clearance changes. This kind of change in dimension causes the output of the sensor 4 to change, and thus becomes a possible cause of loss of reliability of the rotation speed detection.

Therefore, in the case of the invention disclosed in Patent Publication No. Toku Kai He 8-296634, the sensor 4 is placed on a horizontal plane that passes through the center axis of the hub 2, so that with the changes in dimensions of the small clearance kept to a minimum, the reliability of the detected rotation speed is maintained regardless of elastic deformation of the components.

In the case of the invention disclosed in Japanese Patent Publication No. Toku Kai Hei 8-296634, only part of the elastic deformation of the components due to moment load applied to the hub 2 when the automobile turns fast is taken under consideration. Therefore, it is actually impossible to stabilize the dimension of the small clearance between the tip end face of the detection section 19 of the sensor 4 and the end surface of the detected section 14 of the encoder 3. In other words, due to the moment load, the displacement occurs in the rolling-bearing unit such that the center axis of the outer race 1 does not coincide with the center axis of the hub 2, and in addition, displacement that the outer race 1 and the hub 2 shift with reference to each other in the axial direction also occurs. The invention disclosed in Japanese Patent Publication No. Toku Kai Hei 8-296634 only takes into consideration the displacement that the center axis of the outer race 1 does not coincide with the center axis of the hub 2. Therefore, even though the sensor 4 is actually located on the horizontal plane that passes through the center axis of the hub 2, it is not possible to stabilize the dimension of the small clearance, and thus does not contribute much to maintaining the reliability of the detected rotation speed.

SUMMARY OF THE INVENTION

An object of the present invention is to provide a rolling-bearing unit with rotation speed sensor, taking these problems into consideration, wherein the dimension of the small clearance between the detection section of the sensor and the detected section of the encoder is stabilized to maintain the reliability of the rotation speed detection.

BRIEF DESCRIPTION OF THE DRAWINGS

FIG. 9 (B) is a diagram to explain the displacement of minute clearance when subjected to a relatively small moment load in the – direction with reference to the rigidity of the rolling bearing unit.

FIG. 10 (B) is a diagram to explain the displacement of minute clearance when subjected to a relatively large moment load in the – direction with reference to the rigidity of the rolling bearing unit.

DETAILED DESCRIPTION OF THE PREFERRED EMBODIMENTS

The rolling-bearing unit with rotation speed sensor in one embodiment of this invention, similar to the prior art rolling-bearing unit with rotation speed sensor described above, comprises a stationary race that does not rotate during use and has stationary raceways around its stationary peripheral surface, a rotating race that rotates during use and has rotating raceways on its rotating peripheral surface which face the stationary peripheral surface, multiple rolling members that are located between the stationary raceways and rotating raceways, an encoder that is fixed to the rotating race such that it is concentric with the rotating race and has a circular ring-shaped detected section which has magnetic characteristics that alternate and change at equal intervals around in the circumferential direction, and a sensor that has a detection section and is supported by the non-rotating section such that the detection section faces part of the detected section of the encoder and whose output signal changes as the characteristics of the detected section changes.

Particularly, in the rolling-bearing unit with rotation speed sensor of this embodiment of the present invention, the detected portion of the encoder radially faces the detection section of the sensor. And, the sensor is located at a portion which nearly coincides with an imaginary plane that passes through the center axes of both the stationary race and rotating race and extends in the horizontal direction.

The rolling-bearing unit with rotation speed senor of this embodiment constructed as described above, rotatably supports the wheel with respect to the suspension, as well as detects the rotation speed of the wheel, which is similar to that of prior construction mentioned above.

Particularly, in the case of rolling-bearing with rotation speed sensor of this invention, it is possible to keep the change in dimension of the small clearance in the radial direction that exists between the detected section of the encoder and the detection section of the sensor to a minimum, even when the center axis of the stationary member and the center axis of the rotating member do not coincide with each other and at the same time the stationary member and the rotating member shift in the axial direction due to the moment load applied as the automobile is turned fast.

Moreover, even when displacement occurs in the vertical direction between the stationary member and rotating member due to a load applied in the vertical direction, it is possible to keep change in the dimension of the small clearance to a minimum. As a result, the output of the sensor is stabilized, regardless of the elastic deformation in the components members of the rolling bearing unit due to a load that is applied from outside, thus making it possible to improve the reliability of the rotation speed detection.

Figure 1:
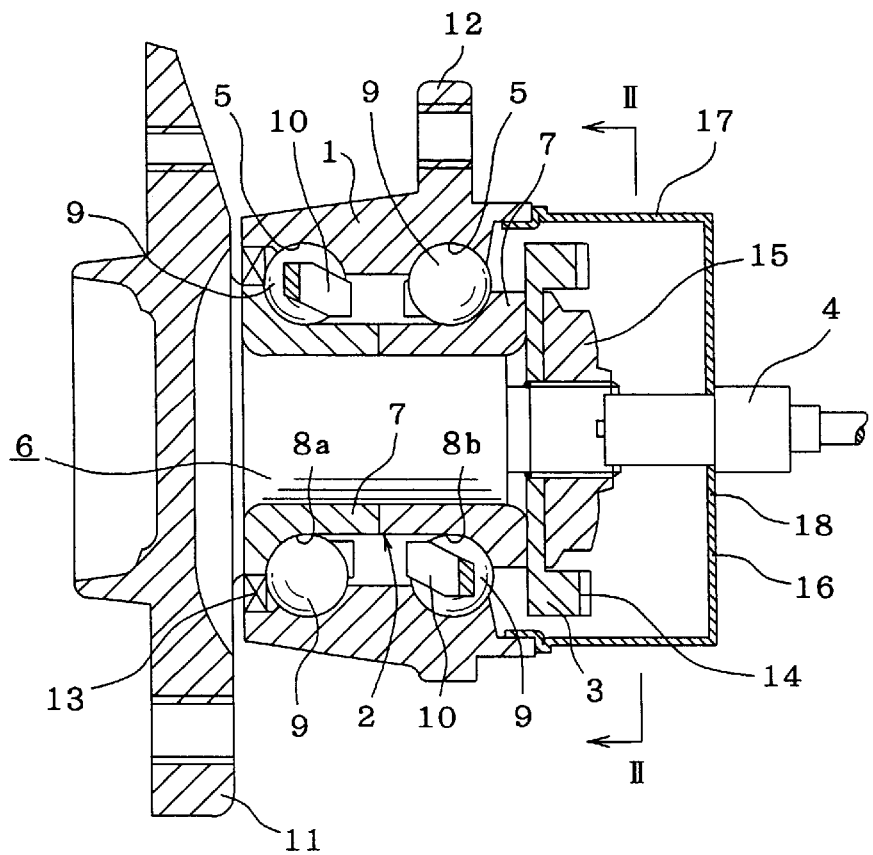
FIG. 1 is a cross sectional view showing a conventional structure of the rolling bearing unit with rotation speed sensor.
Figure 2:
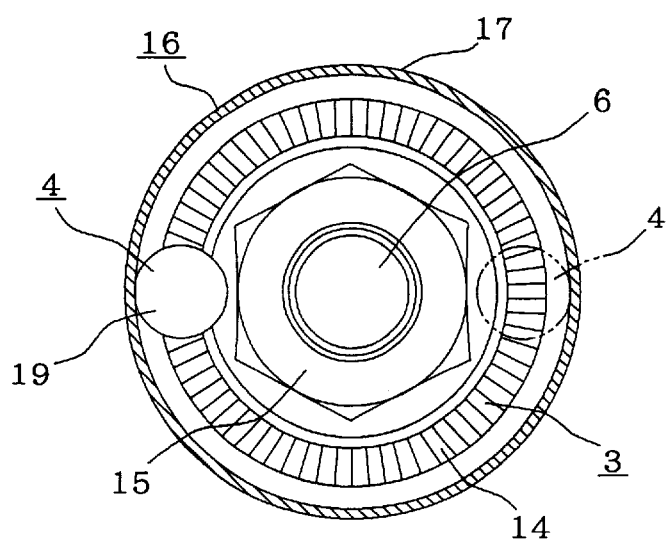
FIG. 2 is a partly cut-away, cross sectional view taken along the line II—II in FIG. 1 with the sensor removed.
Figure 3:
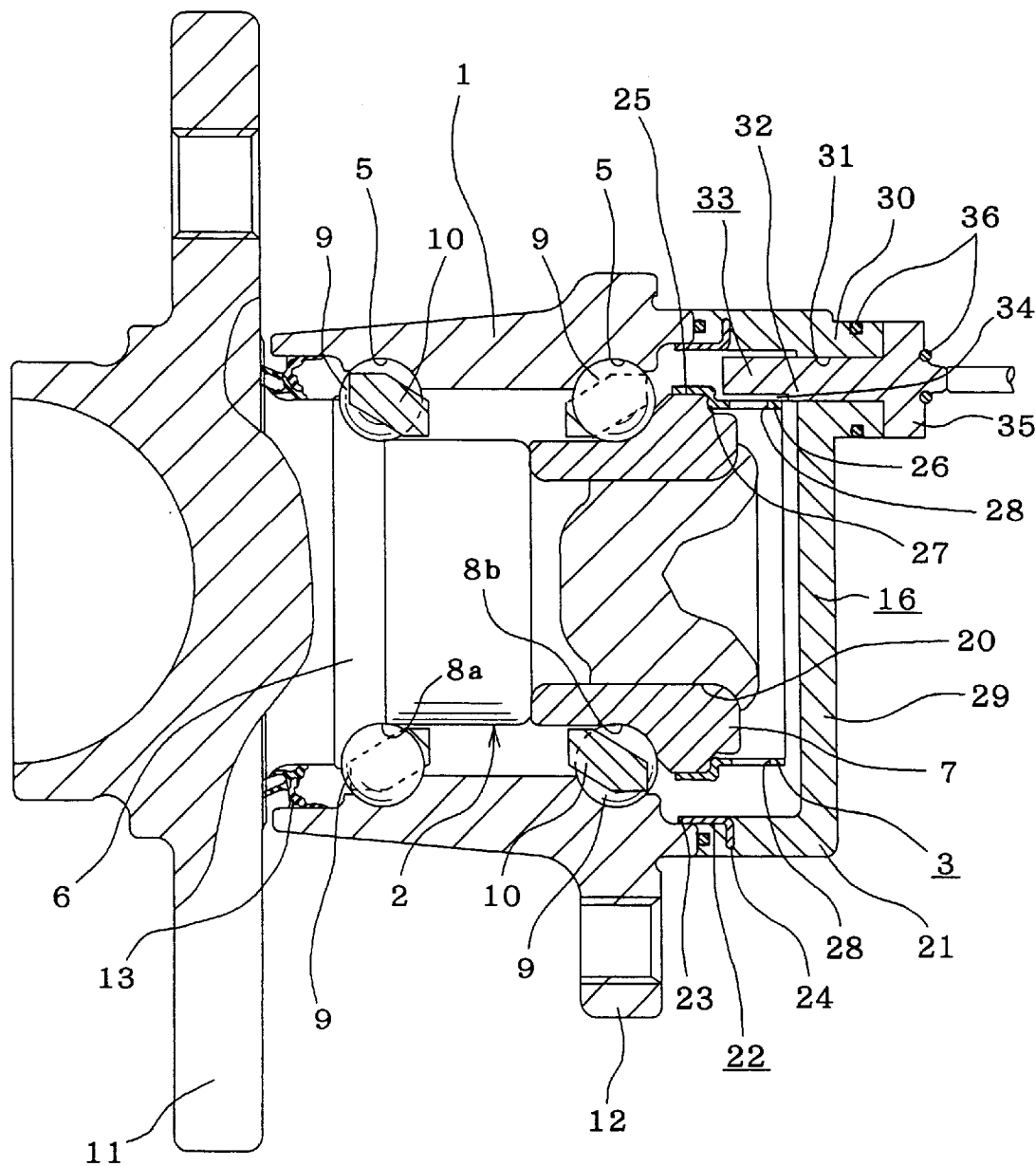
FIG. 3 is a cross sectional view taken along line III–O–III in FIG. 4 to show an example of the embodiments of the rolling bearing-unit in the present invention.
Figure 4:
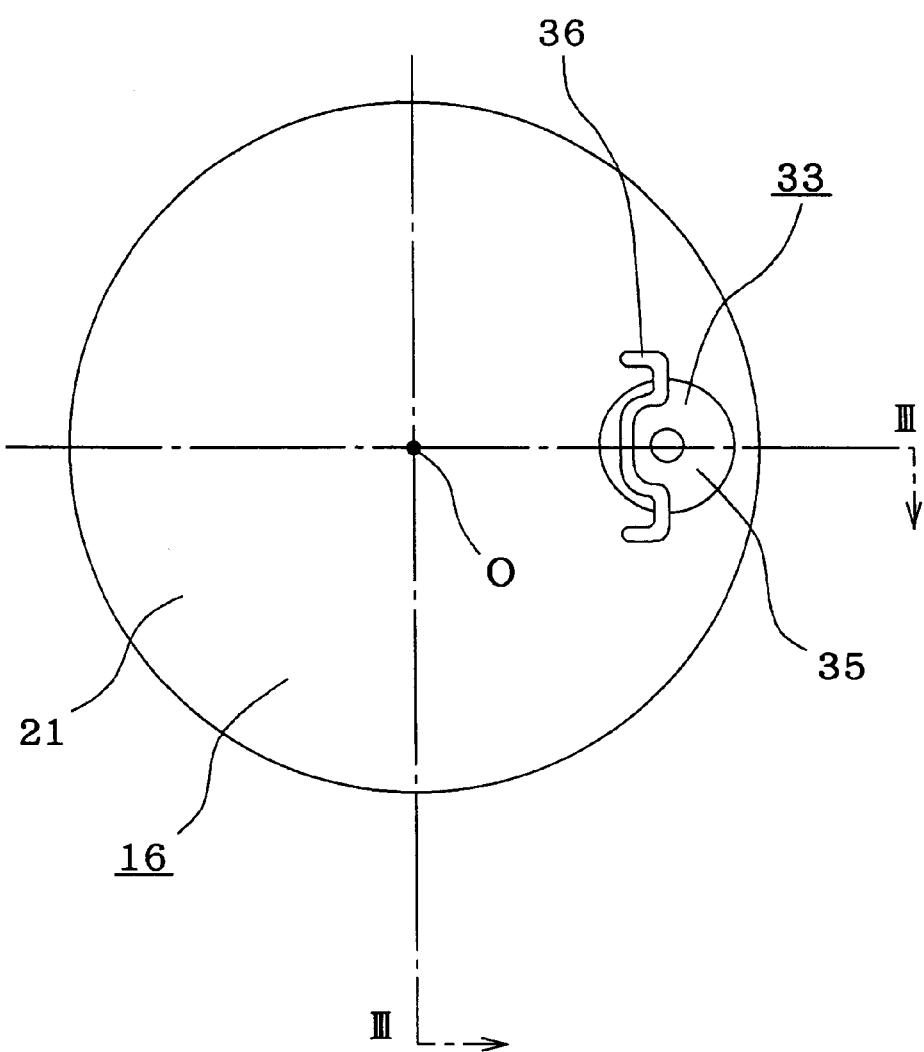
FIG. 4 is a view taken from the right side in FIG. 3.

FIGS. 3 and 4 show a first example of the embodiments of the invention. The upward direction in FIG. 4 corresponds to the upward vertical direction with the unit installed in the automobile, and the downward direction in FIG. 4 corresponds to the downward vertical direction with the unit installed in the automobile. The hub 2, which is the rotating member, comprises the main hub body 6 and inner race 7 securely connected to the main hub body 6. A double row of inner ring raceways 8a, 8b, which are second raceways, are formed around the outer peripheral surface of the hub body 2.

There is a flange 11 for attaching to the wheel around the outer peripheral surface on the axially outer end (left end in FIG. 3) of the main hub body 6. The inner ring raceway 8a provided on the axially outer side on the outer peripheral surface of the mid portion of the main hub body 6, with respect to the double row of inner ring raceways 8a, 8b. And, a small-diameter step section 20 is provided on the axially inner end (right end in FIG. 3) of the main hub body 6.

The inner race 7 fits around this step section 20, and by crimping the axially inner end of the main hub body 6 outward in the radial direction, the inner race 7 is fixed to the axially inner end of the main hub body 6. The inner raceway 8b is formed around the outer peripheral surface of the inner race 7. Several rolling members 9 are located in the space between these inner ring raceways 8a, 8b and the first raceway or outer ring raceways 5 that arc formed around the inner peripheral surface of the stationary member or stationary outer race 1, and they rotatably support the hub 2 on the inside of the outer race 1. In the example shown in the drawings, balls are used as the rolling members 9, however, in the case of a rolling-bearing unit for a heavy automobile, tapered rollers may also be used as these rolling members 9.

Moreover, the base end (left end in FIG. 3) of an encoder 3 fits tightly around the shoulder section that is formed on the axially inner end of the inner race 7 in the section that is separated from the inner ring raceway 8b. This encoder 3 is formed from magnetic metal plate such as carbon steel, and it is formed with a large diameter section 25 at the base and a small diameter section 26 on the tip end half which are connected to each other by a step section 27. Of these two sections, the small-diameter section 26 is formed with through holes 28 in slit shape that are long in the axial direction (left and right direction in FIG. 3) and these through holes 28 are evenly spaced around in the circumferential direction. This small-diameter section 26 has a generally cage like shape, and its magnetic characteristics are changed alternately at equal intervals around in the circumferential direction. The step section 27 comes in contact with the outer peripheral edge of the axially inner end of the inner race 7 to securely position in the axial direction the encoder 3 with reference to the inner race 7.

Also, the small clearance between the opening on the axially outer end of the outer race 1 and the outer peripheral surface around the mid portion of the hub 2 is covered by a seal ring 13. On the other hand, the opening on the axially inner end (right end in FIG. 3) of the outer race 1 is covered by a cover 16. This cover 16 is made of synthetic resin and is formed by injection molding and comprises a cylindrical shaped main body 21 with a bottom, and a fitting tube 22 that is connected to the opening of the main body 21. This fitting tube 22 is made by plastically deforming an anti-corrosive metal plate such as stainless steel, and is generally ring shaped with an L-shaped cross section and comprises a cylindrical fitting section 23 and an outward facing brim section 24 that is bent outward in the radial direction from the base end edge (right end edge in FIG. 3) of the cylindrical fitting section 23. By molding the outward facing brim section 24 at the same time when performing injection molding of the main body 21, this fitting tube 22 is joined with the opening portion of the main body 21. By tightly fitting the cylindrical fitting section 23 of the fitting tube 22 in the axially inner end of the outer race 1, this cover 16 covers the opening on the axially inner end of the outer race 1.

Moreover, in a part of the bottom plate 29 of the main body 21 of the cover 16, a cylinder section 30 is formed which sticks axially inward of the bottom plate 29 in the part which coincides with the imaginary plane that passes through the center axes of the outer race 1 and hub 2 and extends in the horizontal direction. Furthermore, an insert hole 31 is formed on the inside of this cylinder section 30 in the axial direction of outer race 1 for communication between the inside end surface of this cylinder section 30 and the outside surface of the bottom plate 29.

The tip end portion of a sensor unit 33, which comprises a synthetic resin holder 32 and a sensor embedded in the holder 32, is inserted inside this insert hole 31. With this sensor unit 33 inserted into the insert hole 31 as described above, the side surface on the radially inner side (lower surface in FIG. 3) of the tip end of the sensor unit 33 faces the detected portion that is the outer peripheral surface around the small-diameter section 26 of the encoder 3 through a small clearance 34.

In this embodiment, in order that the sensor unit 33 can be installed or removed easily and quickly inside the cover 16, there is a connection spring 36, that is formed by bending elastic and anti-corrosive wire material such as stainless steel, located between the cylinder section 30 and an anchoring brim section 35 formed in the base end (right end in FIG. 3) of the holder 32. This connection spring 36 holds the anchoring brim section 35 against the end surface of the opening of the cylinder section 30. This part is not the main part of this invention, so a detailed explanation is omitted.

The rolling-bearing unit with rotation speed sensor of this invention constructed as described above, supports the wheel such that it can rotate freely with respect to the suspension, as well as detects the rotation speed of the wheel, which is similar to that of the previously known rolling-bearing unit with rotation speed sensor. In other words, when it is installed in an automobile, the outer race 1 is attached to the suspension device by the installation fixture 12 that is attached to the outer peripheral surface of this outer race 1. Moreover, the wheel is attached to the flange 11 that is formed around the outer peripheral surface on the axially outer end of the hub 2.

In this state, the hub 2 rotates together with the wheel, and as the encoder 3, which is supported by the hub 2, rotates, the through holes 28 formed in the smaller diameter portion 26 and the magnetic column sections, located between the circumferentially adjacent through holes 28 alternately pass the area near the detection section of the sensor of the sensor unit 33. This sensor, for example, comprises a permanent magnet, a stator made of magnetic material for conducting the magnetic flux coming from the permanent magnet, a magnetic detection element, such as a Hall effect element or magneto resistive element, the magnetic characteristics of which change according to the amount of magnetic flux passing it, and an IC for converting the changes in characteristics detected by the magnetic detection element. The amount of magnetic flux flowing through the magnetic detection element of the sensor changes as the encoder 3 rotates, so the output of the sensor changes as well. The frequency of the changing sensor output is proportional to the rotation speed of the wheel. Therefore, by sending this sensor output to a controller (not shown in the drawings), it is possible to adequately control the ABS or TCS.

Particularly, in the case of the rolling-bearing unit with rotation speed sensor of this invention, it is possible to keep to a minimum the change in dimension of the small clearance 34 in the radial direction that exists between the outer peripheral surface of the encoder 3 and the detection section of the sensor, even when the center axis of the outer race 1 and the center axis of the hub 2 do not coincide with each other while the outer race 1 and the hub 2 shift from each other in the axial direction due to the moment load applied when the automobile is turned fast.

In other words, both of these center axes stay nearly on the same vertical plane even when the center axis of the outer race 1 and the center axis of the hub 2 do not coincide with each other. Accordingly, by locating the sensor unit 33, which contains the sensor, in an area that coincides with an imaginary plane that runs in the horizontal direction through the center axes of the outer race 1 and the hub 2, there is hardly none if any effect on the change of dimension of the small clearance 34 due to the displacement of these center axes.

Moreover, there is hardly none if any effect on the change in dimension of the small clearance 34 due to the displacement in the axial direction of the outer race 1 and the hub 2.

Furthermore, when a load in the vertical direction is applied due to the weight of the automobile, the center axis of the outer race 1 and the center axis of the hub 2 do not coincide with each other, however, even in this case, since both of these axes shift from each other in the vertical direction along the same vertical plane, there is no effect on the change in dimension of the small clearance 34.

As a result, the output of the sensor is stabilized, regardless of elastic deformation of the components, or in other words the outer race 1, hub 2 and rolling members 9, of the rolling-bearing unit due to an externally applied load, and thus it is possible to improve the reliability of the rotation speed detection.

Figure 5:
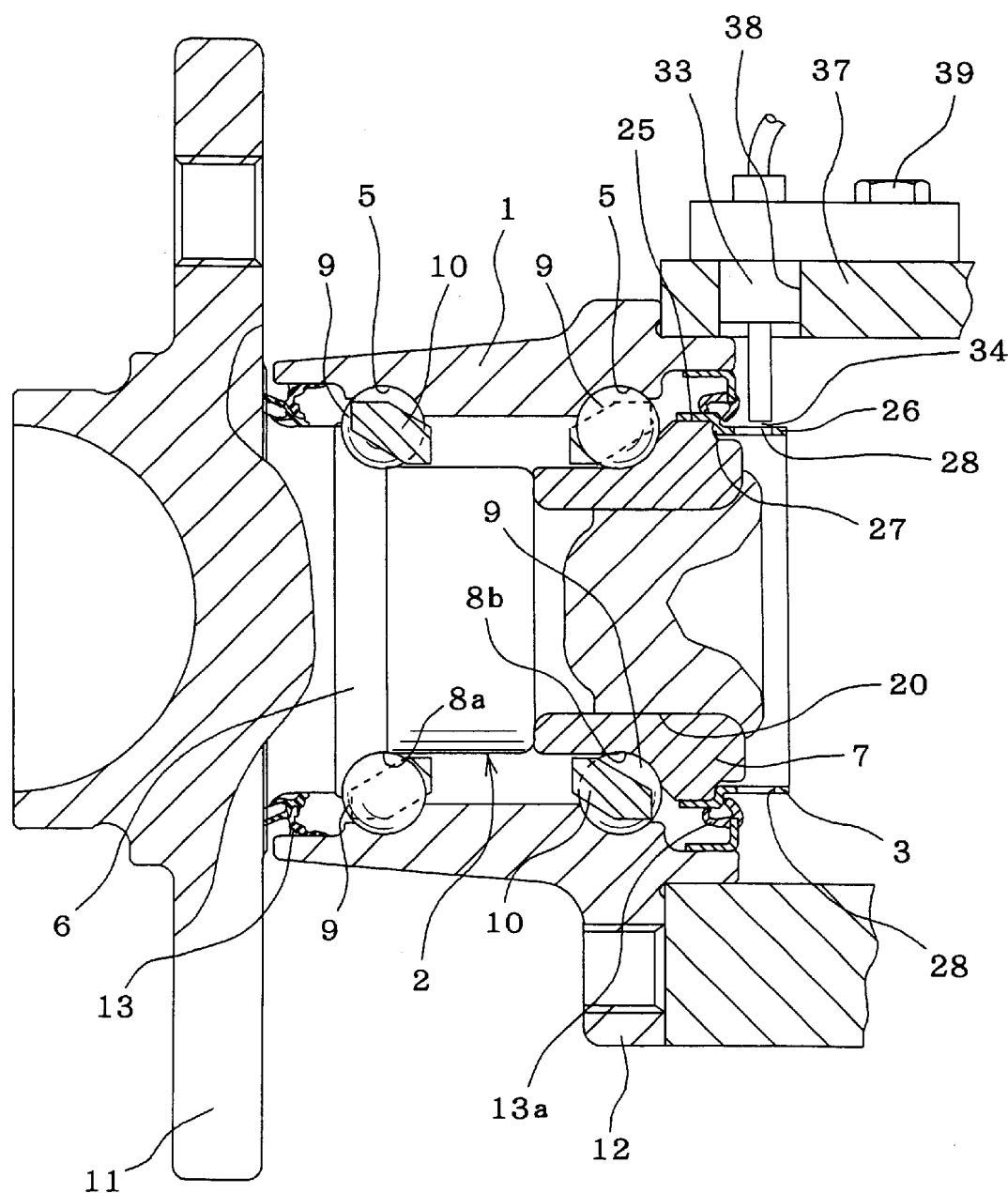
FIG. 5 is a cross sectional view taken along the line V–O–V in FIG. 6 to show a second example of the embodiments of the rolling bearing unit in the present invention.
Figure 6:
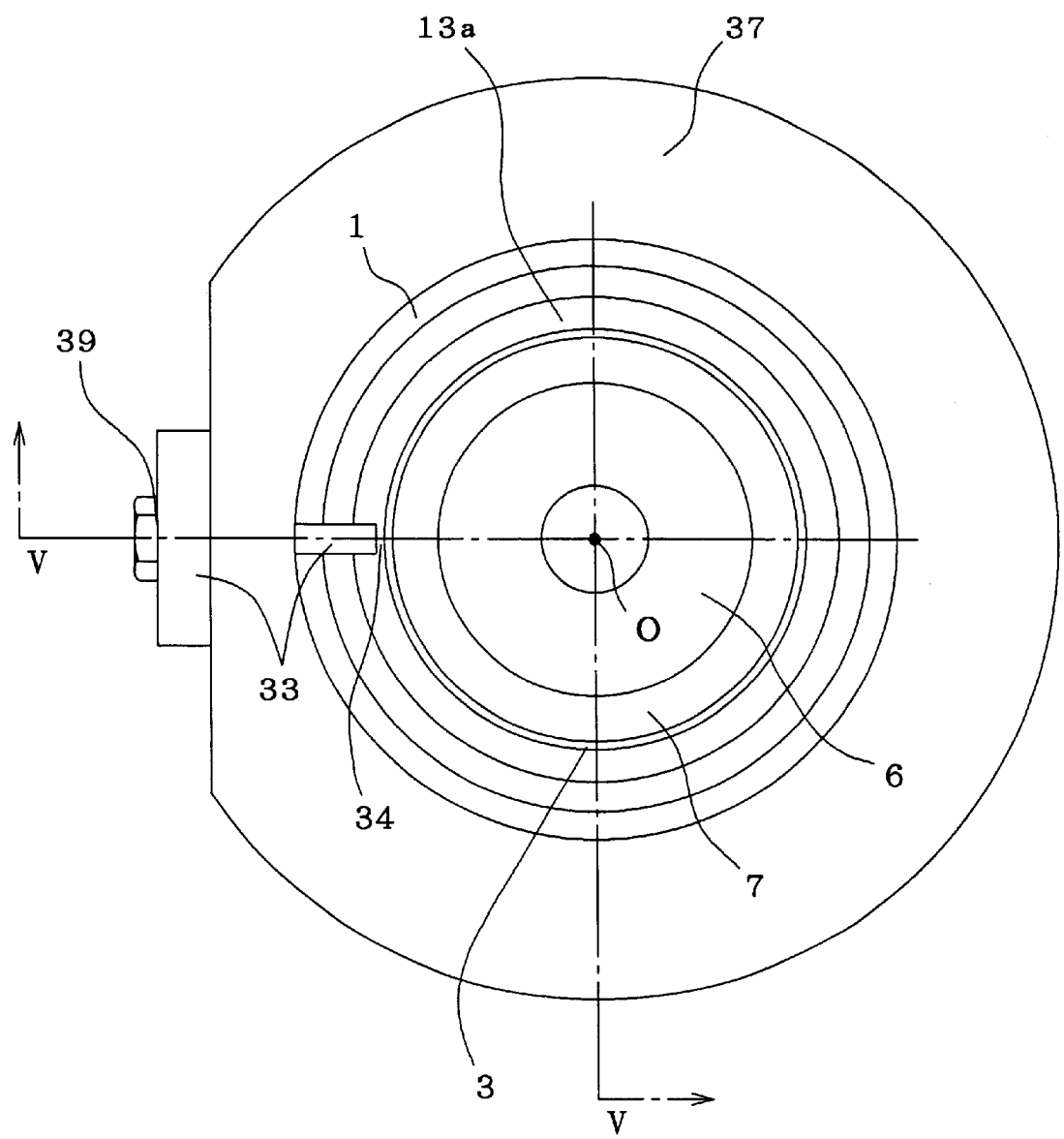
FIG. 6 is a view taken from the right side of FIG. 5.

Next, FIGS. 5 and 6 show a second example of the embodiments of the invention. The upward direction in FIG. 6 corresponds to the upward vertical direction with the unit installed in the automobile, and the downward direction corresponds to the downward vertical direction with the unit installed in the automobile. In this embodiment, a seal ring 13a is fixedly fitted into the axially inner end of the stationary member or outer race 1, such that the edge of the seal lip of the seal ring 13a comes in sliding contact with the outer peripheral surface of the encoder 3 so as to cover the space between the outer peripheral surface on the axially inner end of the inner race 7 and the inner peripheral surface on the axially inner end of the outer race 1.

Moreover, an installation hole 38 is formed on part of the knuckle 37 of the suspension which affixes the outer race 1, such that the part coincides with an imaginary plane that runs horizontally through the center axes of the outer race 1 and hub 2.

The sensor unit 33 which holds the sensor is inserted in the installation hole 38, and the detection section of the sensor faces the outer peripheral surface of the encoder 3 through a small clearance 34 therebetween. In this state, the sensor unit 33 is fastened to the knuckle 37 by a screw 39.

The other construction and function are substantially the same as that of first embodiment described above.

In both the first and second embodiments of this invention, this invention was applied to a rolling-bearing unit with rotation speed sensor that is used for supporting to the suspension device the non-driven wheel of an automobile (rear wheel for the FF vehicle, and front wheel for the FR and RR vehicles). However, this invention can also be applied to a rolling-bearing unit with rotation speed sensor used for supporting to the suspension device the driven wheel of an automobile (front wheel for the FF vehicle, and read wheel for the FR and RR vehicles).

Moreover, it is also possible to apply this invention to a rolling-bearing unit with rotation speed sensor in which the inner-race-like member does not rotate and the outer-race-like member rotates.

Furthermore, it is also possible to apply this invention to a rolling-bearing unit with rotation speed sensor in which the encoder is installed in the mid portion in the axial direction of the rotating member, and the sensor is installed in the mid portion in the axial direction of the stationary member.

The rolling-bearing unit with rotation speed sensor in another feature of this invention, similar to the prior art rolling-bearing unit with rotation speed sensor described above, comprises a stationary race that does not rotate during use and has stationary raceways around its stationary peripheral surface, a rotating race that rotates during use and has rotating raceways on its rotating peripheral surface which face the stationary peripheral surface, multiple rolling members that are located between the stationary raceways and rotating raceways, an encoder that is fixed to the rotating race such that it is concentric with the rotating race and has a circular ring-shaped detected section which has characteristics that alternate and change at equal intervals around in the circumferential direction, and a sensor that has a detection section and is supported by the non-rotating section such that the detection section axially faces part of the detected section of the encoder and whose output signal changes as the characteristics of the detected section changes.

Particularly, in the rolling-bearing unit with rotation speed sensor of this feature of the present invention, the detection section of the sensor with reference to the circumferential direction of the stationary race and rotating race is in an area that coincides with an imaginary plane that runs in the horizontal direction through the center axis of the outer race 1 and hub 2.

Figure 7:
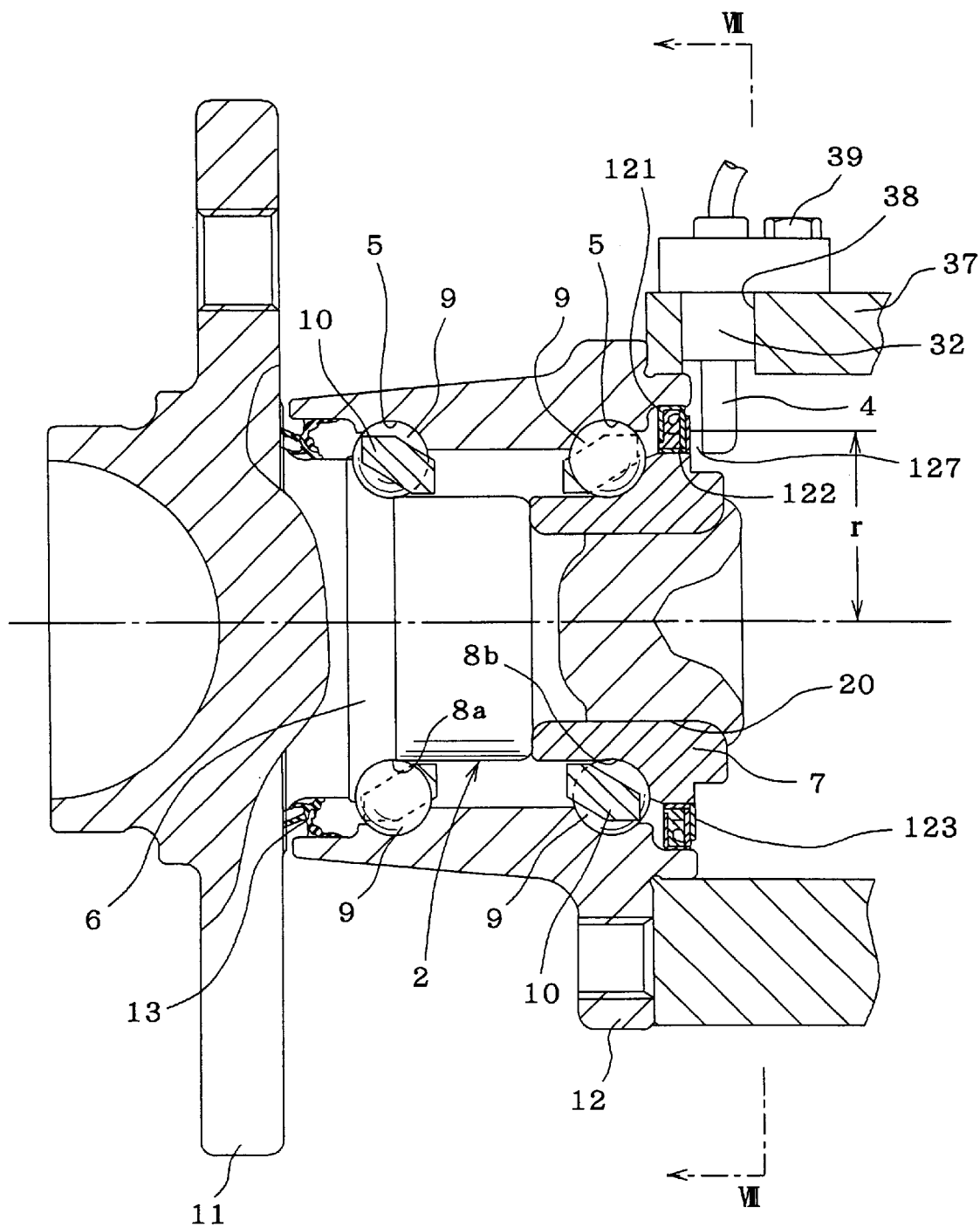
FIG. 7 is a cross sectional view taken along the line VII–O–VII in FIG. 8 to show a third example of the embodiments of the rolling bearing unit in the present invention.
Figure 8:
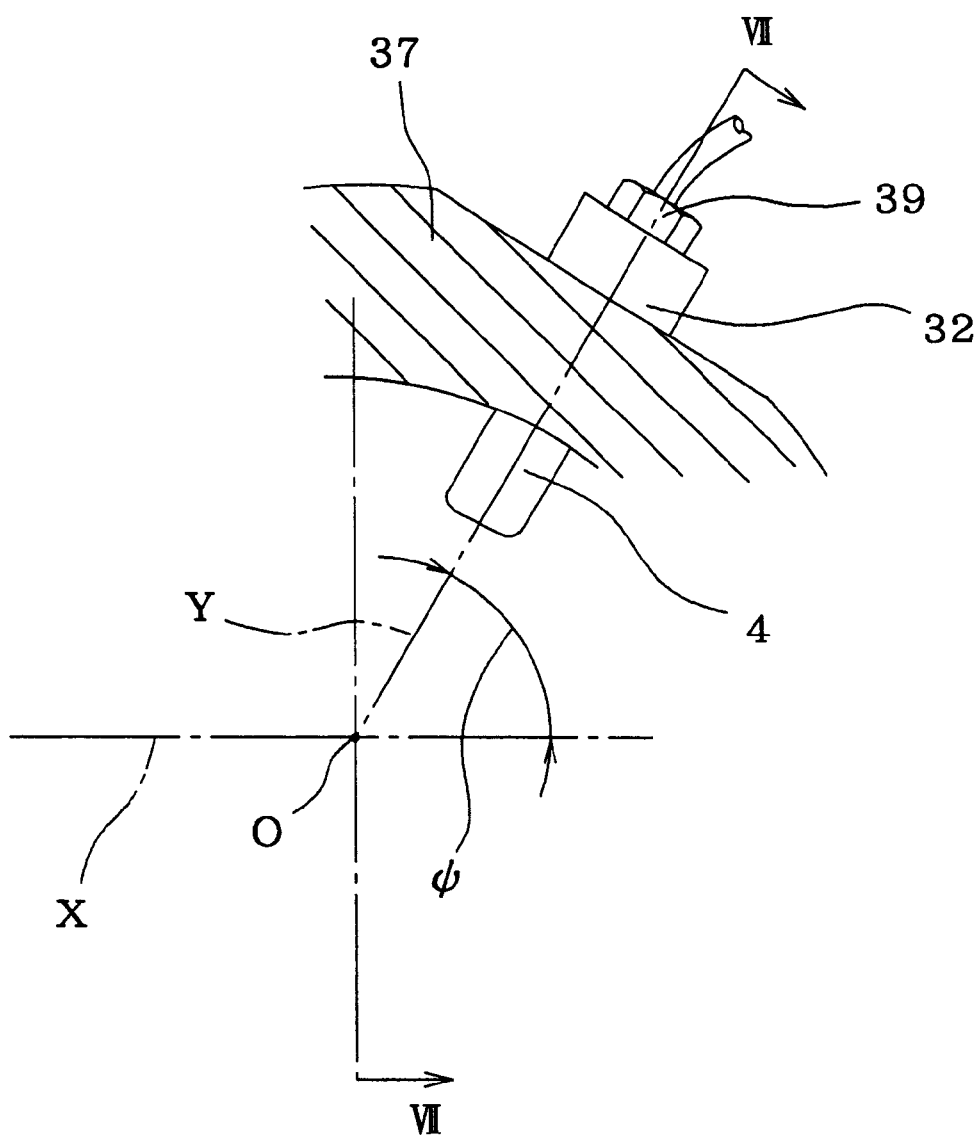
FIG. 8 is a cross sectional view taken along the line VIII–O–VIII to show a major section.

FIGS. 7 and 8 show a third example of the embodiment of invention. The hub 2, which is the rotating member, comprises the main hub body 6 and the inner race 7 connected to the main hub body 6. Around the outer peripheral surface of the main hub body 6, there is a flange 11 for attaching to the wheel on the axially outer end (left end in FIG. 7) thereof. A double row of second raceways or inner ring raceways 8a, 8b is formed around the outer peripheral surface of the hub 2.

With the inner ring raceways 8a, 8b which are formed around the outer surface of the hub body 2, the inner ring raceway 8a on the axially outer side is formed in the mid portion of the main hub body 6. A small-diameter step section 20 is formed on the axially inner end (right end in FIG. 7) of the main hub body 6. The inner race 7 fits around this step section 20, and by crimping the axially inner end of the main hub body 6 outward in the radial direction, the inner race 7 is fixed to the axially inner end of the main hub body 6. The inner raceway 8b is formed around the outer peripheral surface of the inner race 7. Several rolling members 9 are located in the space between these inner ring raceways 8a, 8b and the first raceways or outer ring raceways 5 that are formed around the inner peripheral surface of the stationary member or outer race 1, so that they rotatably support the hub 2 on the inside of the outer race 1.

In the example shown in the drawings, balls are used as the rolling members 9, however, in the case of a rollerbearing unit for a heavy automobile, tapered rollers may also be used as these rolling members 9.

Moreover, the clearance between the opening portion on the axially outer end of the outer race 1 and the outer peripheral surface in the center of the hub 2 is covered by a seal ring 13, and the clearance between the opening portion on the axially inner end of the outer race 1 and the outer peripheral surface on the axially inner end of the inner race 7 is covered by a combination seal ring 121.

This combination seal ring 121 contains a metal ring 122 that is fitted around and fastened to the axially inner end of the inner race 7, and an encoder 123 is mounted to the axially inner surface of the metal ring 122. This encoder 123 is made from a permanent magnet and is entirely circular ring shaped, and magnetized in the axial direction (left and right direction in FIG. 7). The magnetic direction alternates at equal intervals around in the circumferential direction. Moreover, the S pole and N pole are arranged alternately at equal intervals on the axially inner surface, or detected area, of the encoder 123.

Also, an outward flange shaped installation section 12 is formed around the outer peripheral surface on the axially inner end of the outer race 1 and it is fastened to a knuckle 37 which is the non-rotating part of the suspension device. Moreover, there is an installation hole 38 on part of this knuckle 37 in which a holder 32, that holds the sensor 4, is inserted, and the detection section of this sensor 4 faces the inside surface of the encoder 123 with a small clearance 127 of about 0.5 mm in the axial direction between them. In this state, the holder 32 is fastened to the knuckle 37 by a screw 39.

Particularly in the rolling bearing unit with rotation speed sensor of this feature of the present invention, the installation position of the sensor 4 is regulated by its relationship to the rigidity of the rolling bearing unit which comprises the outer race 1, hub 2 and rolling member 9, as described by conditions ① and ② below.

If an automobile, that is installed with this rolling bearing unit with rotation speed sensor, turns such that the rolling bearing unit with rotation speed sensor is located on the outside, then if the acceleration due to the turning of the automobile is assumed to be +1G, the relative displacement in the axial direction between the outer race 1 and hub 2 is taken to be "$\delta_{a1}$".

Also, if the automobile turns such that this rolling bearing unit with rotation speed sensor is located on the inside, then if the acceleration due to the turning of the automobile is assumed to be −1G, the relative displacement in the axial direction between the outer race 1 and the hub 2 is taken to be "$\delta_{a2}$".

Moreover, when an acceleration of +1G is assumed, the angle of inclination (radians) between the center axis of the outer race 1 and the center axis of the hub 2 is taken to be "$\theta_1$".

On the other hand, when an acceleration of −1G is assumed, the angle of inclination (radians) between the center axis of the outer race 1 and the center axis of the hub 2 is taken to be "$0_2$".

Furthermore, the radius of the detected section of the encoder 123 is taken to be "r". The radius "r" of this detected section is the distance from the center axis of the hub 2 to the center in the width direction (radial direction) of the part on the axially inner surface of the encoder 123 that the sensor 4 faces.

Under these conditions:

① If $\delta_{a1} \geq r \cdot \theta_1$ (at the same time $\delta_{a2} \geq r \cdot 0_2$), then the installation position of the sensor 4 with respect to the circumferential direction of the outer race 1 and hub 2 is higher than the center axes of the outer race 1 and hub 2, and nearly coincides with a vertical line that passes through these center axes. In other words, as shown in FIG. 8, the angle of intersection (radians) "ϕ" between the dotted chain line "X" that represents the horizontal line, and the dotted chain line "Y" that represents the center axis of the installation hole 38 is taken to be π/2.

On the other hand:

② If $\delta_{a1} \leq r \cdot 0_1$ and $\delta_{a2} \leq r \cdot 0_2$, then with the installation position of the sensor 4 with respect to the circumferential direction of the outer race 1 and hub 2, the angle of intersection (radians) "100" between the angles of intersection between the dotted chain line "Y" that represents the center axis of the installation hole 38 and the dotted chain line "X" that represents the horizontal line, is give between ϕ$_1$ and ϕ$_2$ which are given by the equations ① and ② below.

$$\phi_1 = \sin^{-1}(\delta_{a1}/r \cdot 0_1) \ldots ①$$

$$\phi_2 = \sin^{-1}(\delta_{a2}/r \cdot 0_2) \ldots ②$$

When actually determining the installation position of the sensor 4, it is not necessary that the above conditions ① and ② be strictly adhered to. Even if the position is shifted |15 degrees from these conditions ① and ②, the dimension of the small clearance 127 will not change so as to become a problem.

With the rolling bearing unit with rotation speed sensor of this embodiment, constructed as described above, the wheel is rotatably supported by the suspension device, and the rotation speed of this wheel is detected in the same way as previously known rolling bearing units with rotation speed sensors. In other words, the hub 2 rotates as the wheel rotates, and as the encoder 123 that is supported by this hub 2 rotates, the S poles and N poles alternately pass by the detection section of the sensor 4. As a result, the direction that the magnetic flux flows in this sensor 4 alternates, and thus the output of the sensor 4 changes. The frequency of this changing output of the sensor 4 is proportional to the rotation speed of the wheel. Therefore, if the output from the sensor 4 is sent to a controller (not shown in the drawings), it is possible to adequately control an ABS or TCS.

Particularly, in the case of the rolling bearing unit with rotation speed sensor of this invention, it is possible to keep to a minimum the change in size in the axial direction of the small clearance 127 that exists between the inside surface of the encoder 123 and the detection section of the sensor 4, even when the center axis of the outer race 1 does not coincide with the center axis of the hub 2 due to the moment load applied when the automobile is turning fast, as well as when the outer race 1 and hub 2 shift from each other in the axial direction. As a result, it is possible to stabilize the output of the sensor 4 and improve the reliability of the dectected rotation speed, regardless of elastic deformation of the components of the rolling bearing unit, that is the outer race 1, hub 2 and rolling members 9, due to the moment load.

Figure 9A:
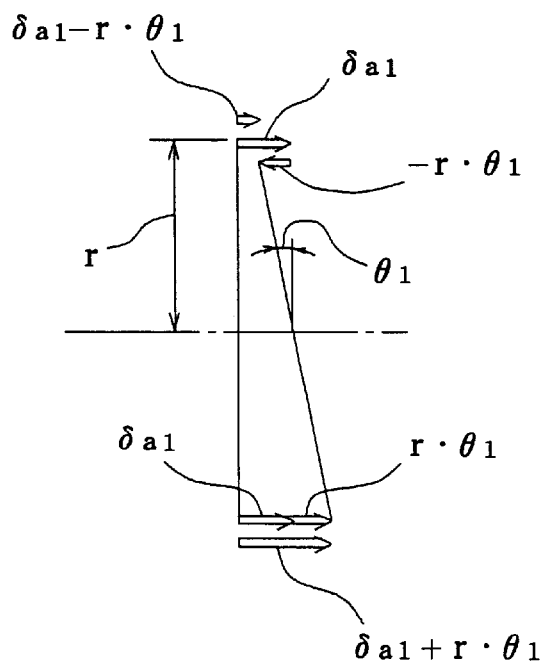
FIG. 9 (A) is a diagram to explain the displacement of minute clearance when subjected to a relatively small moment load in the + direction with reference to the rigidity of the rolling bearing unit.
Figure 9B:
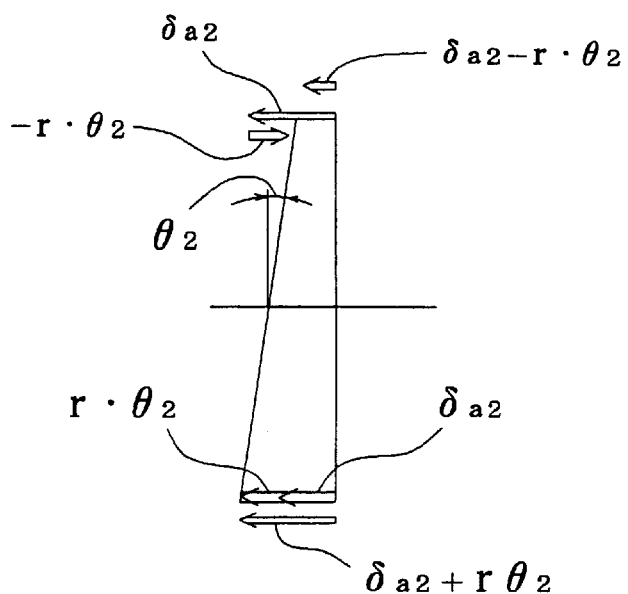

Next, FIGS. 9 and 10 are used to explain the reason why it is possible to keep to a minimum the change in the size of the small clearance 127 by satisfying the aforementioned conditions ① and ②, even when elastic deformation of the components of the rolling bearing unit occurs. Of these FIGS. 9 and 10, FIGS. 9 (A) and 9(B) are diagrams which explain the reason why it is possible to keep to a minimum the change in size of the small clearance 127 when condition ① ($\delta_{a1} \geq r \cdot \theta_1$) is satisfied.

First, referring to the codes used in FIG. 7, FIGS. 9 (A) and 9 (B) are used to explain the case where $\delta_{a1} \geq r \cdot \theta_1$, while at the same time $\delta_{a2} \geq r \cdot \theta_2$. When an automobile turns fast, there is elastic deformation of the outer race 1, hub 2 and rolling members 9 due to the moment load that is applied to the hub 2 from the wheel by way of the flange 11 when turning acceleration occurs.

Also, the size of the small clearance 127 that exists between the detected section of the encoder 123, which is supported by the hub 2, and the detection section of the sensor 4, which is supported by the knuckle 37, changes. For example, if a moment load of +1G is applied to the hub 2, then, as shown in FIG. 9 (A), the center axis of the outer race 1 and the center axis of the hub 2 shift from each other by the angle θ, in the vertical plane, while at the same time, the outer race 1 and hub 2 shift from each other in the axial direction an amount $\delta_{a1}$. This angle, $0_1$, and axial shift, $\delta_{a1}$, can be found from an equation which is related to the previously known bearing rigidity of the double-row rolling bearing.

As the center axis of the outer race 1 and the center axis of the hub 2 shift from each other by an angle, $0_1$, the size of the small clearance 127 tends to increase by the amount $r \cdot 0_1$ at the top position of the small clearance 127, and to decrease by the amount of $r \cdot 0_1$ at the bottom position.

On the other hand, as the outer race 1 and hub 2 shift from each other in the axial direction by the amount $\delta_{a1}$, the size of the small clearance 127 tends to decrease all the way around by the amount $\delta_{a1}$.

If the moment load is applied, the size of the small clearance 127 becomes a combination of the displacement due to the shift in center axes, and the shift in the axial direction. Moreover, when $\delta_{a1} \geq r \cdot \theta_1$, the amount of displacement of the small clearance 127 is, $\delta_{a1} - r \cdot 0_1$ at the top of the small clearance 127, and $\delta_{a1} + r \cdot 0_1$ at the bottom position, and $\delta_{a1}$ at the center in the vertical direction.

On the other hand, if a moment load of −1G is applied to the hub 2, as shown in FIG. 9 (B), the center axis of the outer race 1 and the center axis of the hub 2 shift from each other by the angle, $0_2$, in a vertical plane, while at the same time, the outer race 1 and hub 2 shift from each other by an amount $\delta_{a2}$ in the opposite axial direction to the case when a +1G moment load was applied.

As the center axis of the outer race 1 and the center axis of the hub 2 shift from each other by the angle, $\theta_2$, the size of the small clearance 127 tends to decrease at the top position of the small clearance 127 by the amount of $r \cdot \theta_2$, and to increase by the amount of $r \cdot \theta_2$ at the bottom position.

On the other hand, as the outer race 1 and hub 2 shift from each other in the axial direction by the amount $\delta_{a2}$, the size of the small clearance 127 tends to decrease all the way around by the amount $\delta_{a2}$.

If $\delta_{a2} \geq r \cdot \theta_2$, the amount of displacement of the small clearance 127 is, $\delta_{a2} - r \cdot \theta_2$ at the top of the small clearance 127, and $\delta_{a2}^{-1} r \cdot \theta_2$ at the bottom. Also, it is $\delta_{a2}$ at the center in the vertical direction. Therefore, when $\delta_{a1} \geq r \cdot \theta_1$, while at the same time $\delta_{a2} \geq r \cdot \theta_2$, then it can be seen that the amount of displacement of the small clearance 127 is smallest at the top position.

Figure 10A:
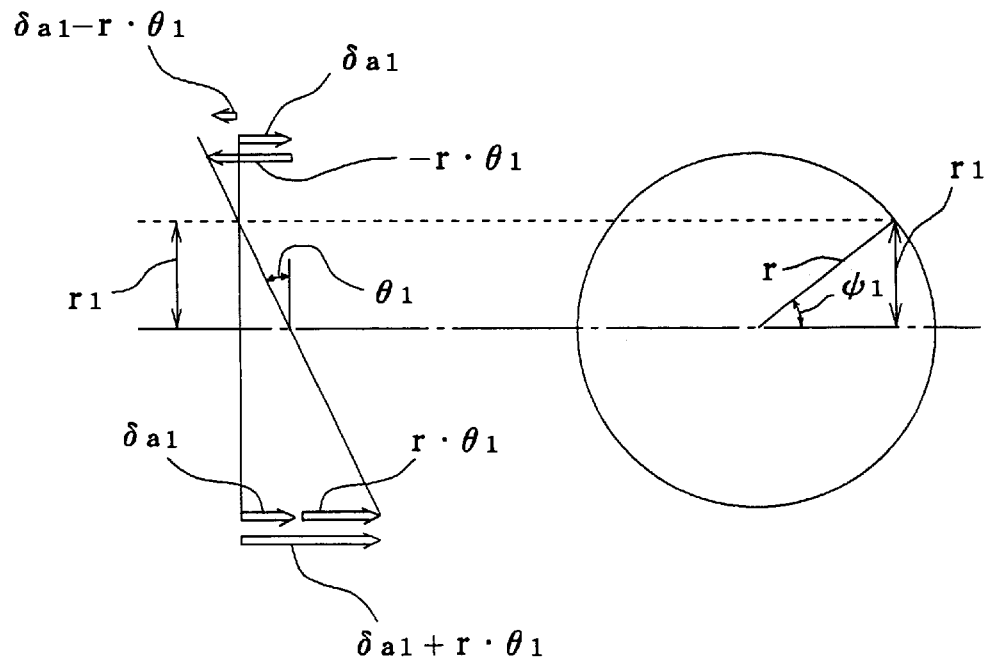
FIG. 10 (A) is a diagram to explain the displacement of minute clearance when subjected to a relatively large moment load in the + direction with reference to the rigidity of the rolling bearing unit.
Figure 10B:
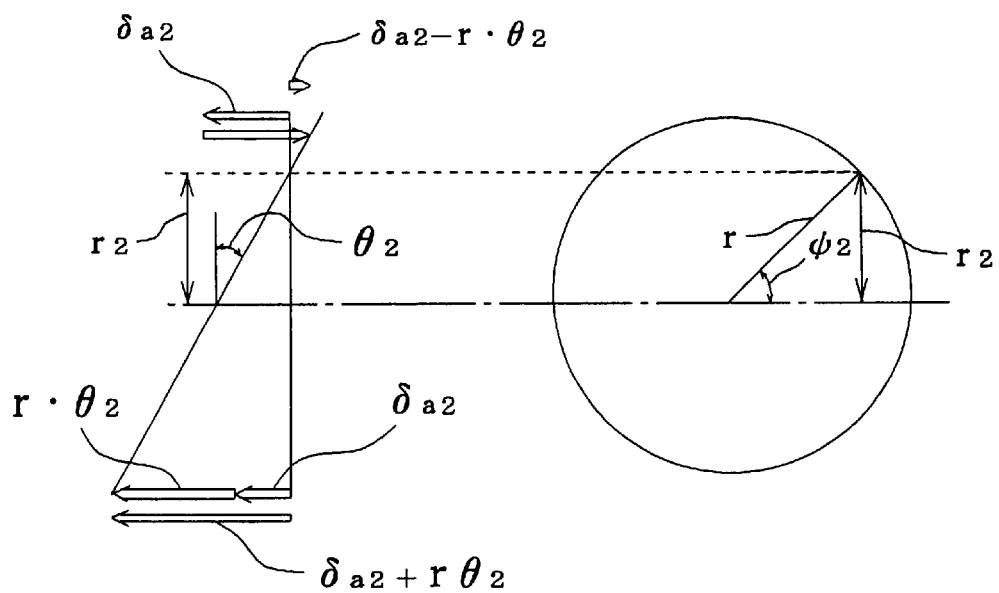

Next, FIGS. 10(A) and 10(B) will be used to explain the case when $\delta_{a1} \geq r \cdot \delta_{a1}$, while at the same time, $\delta_{a2} \geq r \cdot 0$. First, when a moment load of +1G is applied to the hub 2, as shown in FIG. 10(A), the amount of displacement of the small clearance 127 becomes $\delta_{a1} - r \cdot 0_1$ at the top of this small clearance 127, and $\delta_{a1} + r \cdot \theta_1$ at the bottom.

However, when $\delta_{a1} \leq r \cdot 0_1$, there are two places in the circumferential direction where the displacement of the small clearance 127 is zero because the displacement that occurs as the center axes of the outer race 1 and hub 2 shift from each other and the displacement, $\delta_{a1}$, in the axial direction cancel each other.

If the distance from the center (where the center of the radius r of the detected section of the encoder 123= center axes of the outer race 1 and hub 2) of this small clearance 127 to this point in the vertical direction is taken to be $r_1$, and the angle of intersection, where the line that connects this point with the center crosses the horizontal line, is taken to be $\phi_1$, then $r_1 - \delta_{a1}/0_1$, and $\phi_1 - \sin^{-1}(r_1/r) = \sin^{-1}(\delta_{a1}/r \cdot 0_1)$.

If the detection section of the sensor 4 faces the detected section of the encoder 123 at the point where these conditions are satisfied, , then there is no change in the size of the small clearance 127 regardless of whether or not a moment load of |1 G is applied while the automobile is running.

Next, when a moment load of −1G is applied to the hub 2, as shown in FIG. 10 (B), the amount of displacement of the small clearance 127 becomes $\delta_{a2} - r \cdot \theta_2$ at the top of the small clearance 127, and $\delta_{a2} + r \cdot \theta_2$ at the bottom. Also, at the point where the distance in the vertical direction from the center of the small clearance 127 is $r_2$, the displacement due to the shift of the center axes of the outer race 1 and hub 2 from each other and the displacement, $\delta_{a2}$, in the axial direction, cancel each other, so that the displacement of the small clearance 127 is zero. When the angle of intersection, where the line that connects the point where the displacement is zero with the center, crosses with the horizontal line is taken to be $\phi_2$, then $\phi_2 = \sin^{-1}(r_2/r) = \sin^{-1}(\delta_{a2}/r \cdot \theta_2)$.

At the point where this condition is satisfied, if the detection section of the sensor 4 faces the detected section of the encoder 123, then there is no change in the size of the small clearance 127, regardless of whether or not a moment load of −1G is applied when the automobile is running.

The moment load that is applied while the automobile is running, is applied in either the positive or negative corresponding to the direction the automobile is moving, so if the installation position of the sensor 4 with respect to the circumferential direction of the outer race 1 and hub 2 is placed between $\phi_1$ and $\phi_2$ {or desirably at a position where the angle (radiam) with respect to the horizontal line is $(\phi_1 + \phi_2)/2$}, then it is possible to improve the reliability of the rotation speed of the wheel detected by the sensor 4, regardless of what direction the moment load is applied.

The reason that an acceleration of 1G (horizontal acceleration) was used as the condition for restricting the installation position of sensor 4 was that it corresponds to the maximum acceleration that is applied with a normal automobile (passenger automobile). In other words, keeping the displacement of the small clearance 127 to minimum under conditions when the displacement of the small clearance is most severe was considered.

Figure 11:
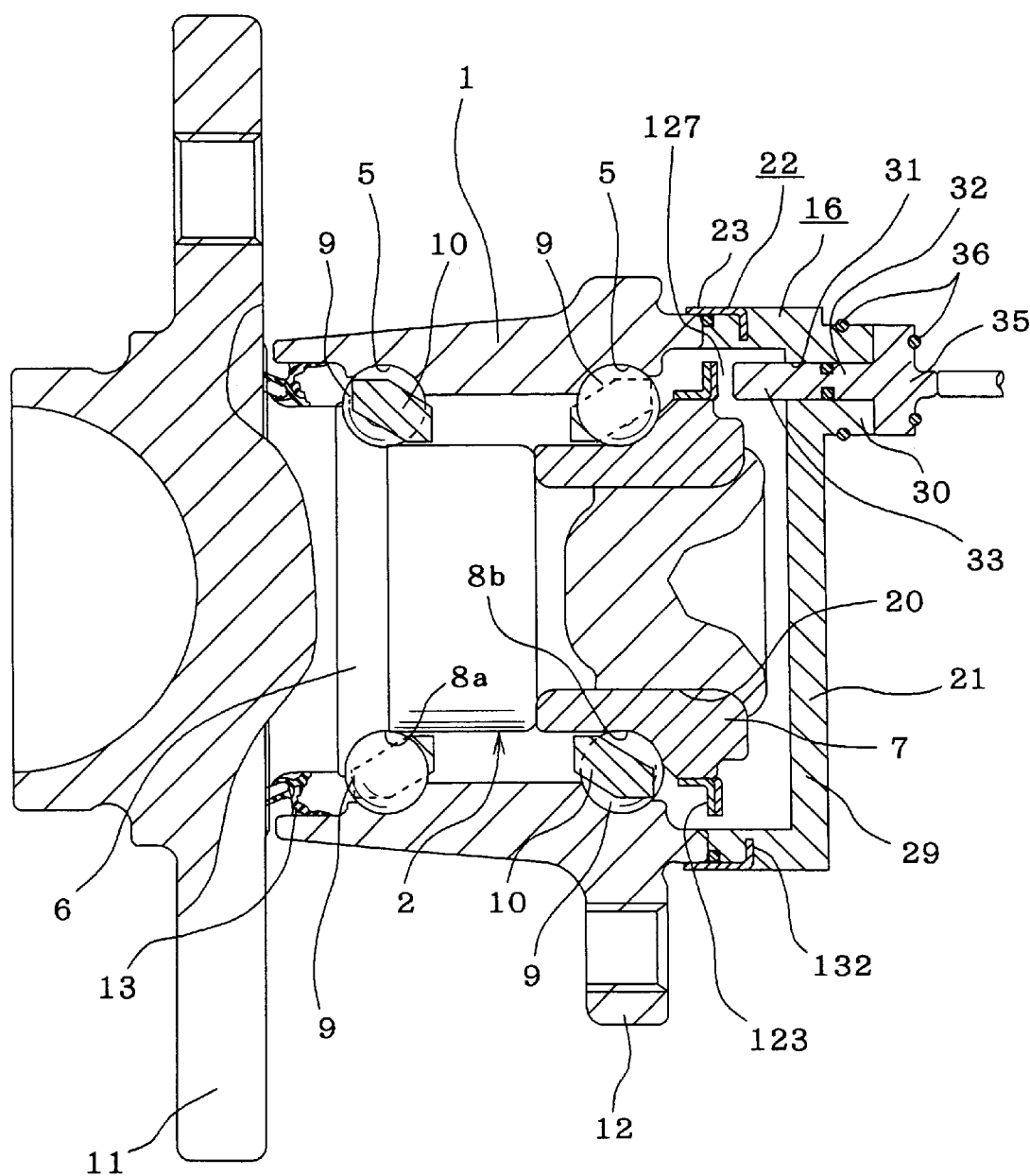
FIG. 11 is a cross sectional view similar to FIG. 7 to show a fourth example of the embodiments of the present invention.

FIG. 11 shows a fourth example of the embodiments of the present invention, where the opening at the axially inner end (right end in FIG. 11) of the stationary member or outer race 1 is covered by the cover 16, which is comprised of a main body 21 in a bottomed cylindrical shape, formed by injection molding of synthetic resin, and a fitting tube 22 connected to the opening portion of main body 21.

The fitting tube 22 is produced by plastic-working a corrosion-resistant metal plate such as stainless steel, and formed in a generally annular shape with an L-shaped cross section, and comprised of a cylindrical fitting portion 23 and an inwardly facing brim portion 132 bent radially inward from the base end edge (right end edge in FIG. 11) of the cylindrical fitting portion 23.

The fitting tube 22 is connected to the opening portion of the main body 21 by molding the inwardly facing brim portion 132 upon injection molding the main body 21. The cover 16 constructed as described above closes the opening at the axially inner end of the outer race 1 with the fitting tube 22 the cylindrical fitting portion 23 of which is fitted on and fixed to the axially inner end of the outer race 1.

On the portion of the bottom plate 29 of the main body 21 of the cover 16, which faces the axially inner side face of the encoder 123 fixedly fitted onto the axially inner end of the inner race 7 of the rotatable member or hub 2, a cylindrical portion 30 is formed to project in the axially inner direction from the bottom plate portion 29. Formed on the inside of the cylindrical portion 30 in the axial direction (left and right directions in FIG. 11) of the outer race 1 is an insert hole 31 which communicates the axially inner end surface of the cylindrical portion 30 with the outside surface of the bottom plate portion 29.

Inserted into the insert hole 31 is the tip end portion of the sensor unit 33 which has a sensor embedded in the holder 32 made of synthetic resin. With the sensor unit 33 inserted into the insert hole 31, the tip end face of the sensor unit 33 faces the axially inner side surface of the encoder 123, that is the detected portion, with the small clearance 127 axially between them.

In order to mount and remove the sensor unit 33 to and from the cover 16 in an easy and instant manner, in this example, a connection spring 36 is provided between the cylindrical portion 30 and the anchoring brim portion 35 at the base end (right end in FIG. 11) of the holder 32. The connection spring 36 is made of a corrosion-resistant and resilient wire member such as stainless spring steel and formed through a bending process.

The anchoring brim portion 35 is retained to the end face of the opening portion of the cylindrical portion 30 by the connection spring 36. Incidentally, this section is not important for the present invention, and detail is omitted. The mount portion of the sensor unit 33 with respect to the cover 16 is controlled as in the first example previously mentioned.

Figure 12:
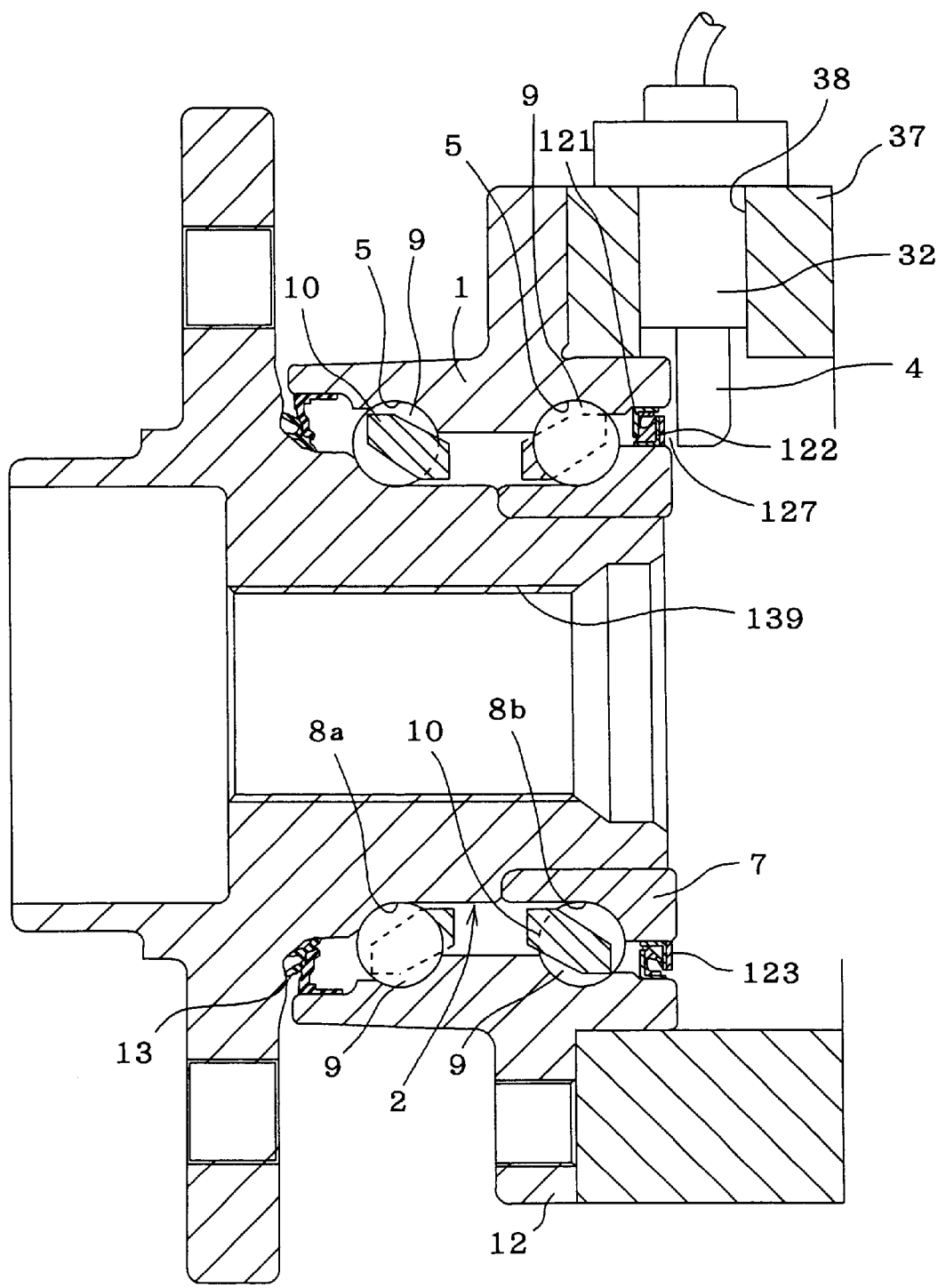
FIG. 12 is a cross sectional view similar to FIG. 7 to show a fifth example of the embodiments of the present invention.

FIG. 12 shows a fifth example of the embodiments in the present invention. In this example, the present invention is applied to the rolling bearing unit with rotation speed sensor for supporting to the suspension the driven wheel (front wheels of the FF vehicle, rear wheels of the FR vehicle and RR vehicle, and the whole wheels of the 4WD vehicle) of the automobile, while in the third and fourth examples, the present invention is applied to the rolling bearing unit with rotation speed sensor for supporting to the suspension the non-driven wheel (rear wheels of the FF vehicle, and front wheels of the FR vehicle and RR vehicle) of the automobile. Accordingly, in the present example, the rotatable member or hub 2 is formed in a cylindrical shape, and female spline section 139 is formed on the inner peripheral surface of the hub 2. Then, a drive shaft (not shown) with a male spline section on its outer peripheral surface can be inserted into the female spline section 139.

That the encoder 123 is mounted to the combination seal ring 121 to close the space between the inner peripheral surface at the inner end of the stationary member or outer race 1 and the outer peripheral surface at the inner end of the inner race 7 of the hub 2, that the sensor 4 is fixedly mounted to the knuckle 37 for fixedly supporting the outer race 1, and the mount position of the sensor 4 is controlled are similar to the first embodiment previously described. The present invention is characterized in that the size of the small clearance between the detected portion of the encoder and the detecting portion of the sensor is prevented from changing as the automobile rapidly turns. The structures of the rolling bearing unit, encoder and sensor can be of any conventional type and not limited to the ones illustrated. For example, the present invention can be applied to the rolling bearing unit with the stationary inner race and rotatable outer race.

The rolling-bearing unit with rotation speed sensor of this invention, is constructed and functions as described above, and is effective in stabilizing the sensor output and improving the reliability in detecting the rotation speed of the wheel.

What is claimed is:

1. A rolling bearing unit with a rotation speed sensor comprising:

a stationary member having a first raceway, a rotatable member having a second raceway, a plurality of rolling members rotatably provided between the first raceway and the second raceway, an encoder fixed to the rotatable member and to be concentric with the rotational axis thereof and having a detected portion the magnetic characteristics of which are adapted to alternately change, and a sensor fixed to the stationary member to detect changes in the magnetic characteristics of the encoder to produce signals as the rotatable member rotates, and the sensor radially opposed to the detected portion of the encoder with a clearance therebetween at a circumferential location where the change in the clearance is minimized when subjected to a load from outside.

* * * * *